United States Patent Office 2,947,780
Patented Aug. 2, 1960

2,947,780

CYCLOHEXENE AND HEXADIENE CARBOXALDEHYDES AND DERIVATIVES THEREOF

Robert W. Teegarden, Fair Haven, and Leonard Steinbach, New Shrewsbury, N.J., assignors to International Flavors & Fragrances, Inc., New York, N.Y., a corporation of New York No Drawing. Filed Jan. 15, 1960, Ser. No. 2,602

6 Claims. (Cl. 260—488)

This invention relates to substituted cyclohexene and cyclohexadiene compounds resulting from condensation with a diene alcohol, more particularly cyclohexene and cyclohexadiene compounds resulting from condensation with the diene alcohol, 2-methyl, 2-hydroxy, 6-methylene, octene-7 and hydrogenation and ester derivatives thereof, which are valuable new perfume materials.

The principal objects of the invention are to provide useful compounds of the type mentioned.

The invention accordingly consists of the novel products the specific embodiments of which are described hereinafter by way of example.

The diene alcohol, 2-methyl, 2-hydroxy, 6-methylene, octene-7, or myrcenol, is a known compound derived directly from the beta-substituted butadiene, myrcene, by addition of the elements of water across its isolated double bond. In its pure state it has the following constants: B.P.$_{1.5\ mm}$ 57°–60° C., $n_D^{25}$ 1.4723, $D_{25}$ 0.882.

It may be prepared in several known ways, two of which are as follows:

(a) Sulfuric acid catalyzes the addition of acetic acid to myrcene at a temperature ranging from 10° to 30° C. to give a mixture consisting essentially of myrcenyl and terpinyl acetates. Myrcene is preferably dissolved in a molar excess of acetic acid sufficient for complete miscibility, and $H_2SO_4$ is then gradually added. The mixture of acetates produced is saponified by potassium or sodium hydroxide, and the resultant alcohol, myrcenol, separated by vacuum fractionation.

(b) Myrcene (containing 70 to 75% of myrcene and the remainder inert terpenes) was hydrochlorinated at 10° C. with anhydrous HCl gas. The resultant hydrochloride was hydrolyzed by refluxing with a mixture of sodium acetate, calcium carbonate, and 2,6-ditertiary butyl para cresol with added water. After the reflux period the mass was steam distilled and the distillate was stripped of unreacted terpene by topping under vacuum. The residue was refluxed with potassium hydroxide in anhydrous alcohol. The alcohol was recovered by atmospheric distillation, and the residue was washed neutral with salt water and benzol. After removal of the benzol the residue consisted of impure myrcenol.

Myrcenol, due to its conjugated dienic structure, is very susceptible to heat, and accordingly tends to polymerize on distillation. It is accordingly preferable, from a practical standpoint, to effect condensation thereof in its crude state, containing impurities, or after one simple distillation to remove some of these impurities. Furthermore, myrcenol prepared by the above indicated method (a) occurs to the extent of only 10 to 50% in the resultant product (10 to 40% in (b)), the remainder consisting principally of a mixture of $C_{10}$ alcohols, viz. terpineol and linalool. Myrcenol reacts readily and selectively with dienophiles to yield higher boiling adducts which can be easily separated from the unreacted $C_{10}$ alcohols by simple fractionation. These unreacted alcohols are inert to the reaction with the dienophiles hereinbefore mentioned.

The products formed in accordance with our invention include 4-(4-methyl 4-hydroxy amyl)Δ-3 substituted cyclohexene compounds. They have the following formula:

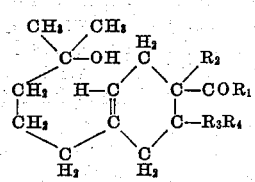

where $R_1$, $R_2$, $R_3$, and $R_4$ each represents a substituent selected from the group consisting of hydrogen, a lower alkyl group containing not more than 4 carbon atoms, a phenyl group, and a lower alkylated phenyl group, said lower alkyl of such phenyl group having not more than 2 carbon atoms.

The products also include compounds having the following formula:

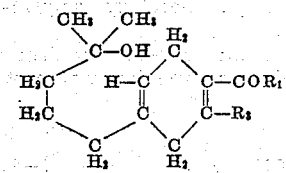

The products also include hydrogenation and ester products of the compounds whose structural formulae are as given in the last two paragraphs.

Specifically, the reaction products include:

(a) The reaction product of myrcenol and acrolein, which has the formula:

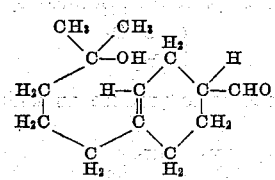

which is 4-(4-methyl, 4-hydroxy amyl)Δ-3-cyclohexene carboxaldehyde; (b) the reaction product of myrcenol and crotonaldehyde, which has the formula:

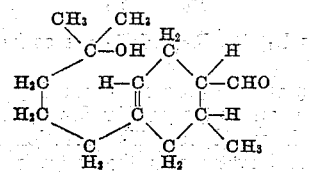

which is designated as 6-methyl-4-(4-methyl, 4-hydroxy amyl)Δ-3-cyclohexene carboxaldehyde; (c) the reaction product of myrcenol and propargyl aldehyde, which has the formula:

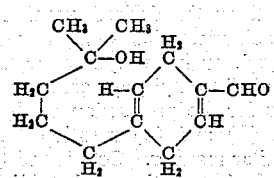

which is designated 4-(4-methyl-4-hydroxy amyl)Δ3,6-cyclohexadiene carboxaldehyde.

The compounds also include the hydrogenation product of 4-(4-hydroxy-4-methyl amyl)-Δ3-cyclohexene carboxaldehyde, having the formula:

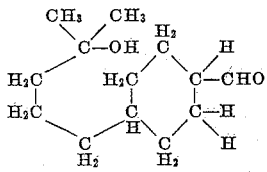

The reaction products also include lower alkanoic acid esters of said 4-(4-methyl-4-hydroxy-amyl)Δ3-substituted cyclohexene compounds. Such esters include the lower alkanoic acid esters of 4-(4-methyl-4-hydroxy amyl)Δ-3-cyclohexene carboxaldehyde, and have the formula:

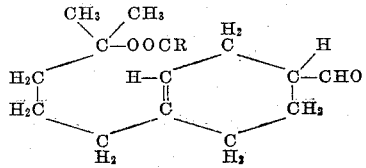

where OOCR is a lower alkanoic acid radical. The lower alkanoic acids mentioned refer to the formate, acetate, propionate and butyrate, and the iso-compounds of the last two mentioned acid radicals. The acetate (f) is designated 4-(4-methyl, 4-acetoxy amyl)Δ-3-cyclohexene carboxaldehyde.

In carrying out the process to produce compounds in accordance with our invention we react myrcenol as follows:

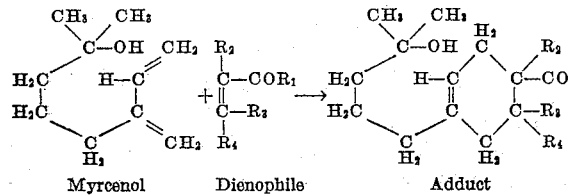

Myrcenol          Dienophile          Adduct

If the above dienophile is substituted by the dienophile

the reaction proceeds to produce an adduct having the formula:

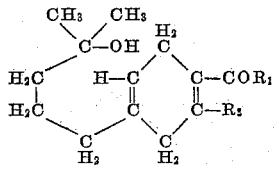

The symbols $R_1$, $R_2$, $R_3$ and $R_4$ are as hereinabove designated.

In carrying out the process for making the compounds so designated, an antipolymerization agent, such as hydroquinone, is employed. The reaction is carried out at elevated temperatures in the range of about 80° C. to 175° C. for a period of time of about 2 to 6 hours, in a sealed reactor. After the reaction has been carried on for the period mentioned, it is allowed to cool and the contents removed and preferably subjected to vacuum fractionation. The inert isomeric $C_{10}$ alcohols distill off first, followed by the desired reaction product. Instead of hydroquinone, other antipolymerization agents may be employed, such as hydroquinone monomethyl ether, t-butyl and di-t-butyl para cresols.

The processes for the production of the products designated as (a), (b) and (c) mentioned above are carried out in a similar manner. Compound (d) is prepared by successively hydrogenating and oxidizing compound (a) as described below, and compound (e) represents the acetate ester of compound (a) and may be prepared as described below.

The following are examples of the manner in which we now prefer to carry out the process to produce the products of our invention:

EXAMPLE 1

1,438 grams alcohol mixture (40% myrcenol content, 60% alcohols inert to the reaction hereinbelow), 432 grams acrolein, and 10 grams hydroquinone are combined in a sealed reactor and heated to 150° C. for 4½ hours accompanied by agitation. The reactor is allowed to cool and the contents removed and subjected to vacuum fractionation. After a forerun of unreacted inert isomeric $C_{10}$ alcohols distills off, there are obtained 640 g. of product of B.P.$_{.2\ mm}$ 126–133°. On redistillation, there was obtained 442 g. of product of B.P.$_{.1\ mm}$ 120–122° C., with a refractive index at 20° C. 1.4915; specific gravity at 20° C., 0.9941; optical rotation, −0.02; ultraviolet absorption maximum, 292 millimicrons. The product tests 99.7% aldehyde by oximation test. Yield by weight=56.8%, based on the myrcenol used. The product is 4-(4-methyl, 4-hydroxy amyl)Δ3-cyclohexene carboxaldehyde. This product has a very sweet lilac-lily aromatic odor.

EXAMPLE 2

1,200 grams of alcohol mixture (testing 40% as myrcenol, 60% alcohols inert to the reaction hereinbelow), 400 grams of crotonaldehyde, and 10 grams of hydroquinone, are combined in a reactor and heated for 4 hours at 150° C., accompanied by agitation. The reactor is allowed to cool, the contents removed, and subjected to vacuum fractionation. After a forerun of unchanged inert isomeric $C_{10}$ alcohols distills off, there is obtained a product section of 425 g., boiling in the range of 137–139°, at 2.5 mm., and exhibiting an $n_D^{25}$ of 1.4867, and a 99% aldehyde content by standard oximation test. Yield by weight=60% of 6-methyl, 4-(4-methyl, 4-hydroxy amyl)-Δ3-cyclohexene carboxaldehyde. This product has a bland, sweet, lily-like note.

EXAMPLE 3

*Preparation of 4-(4-hydroxy-4-methyl amyl)-cyclohexane carboxaldehyde*

*Step 1.*—500 grams of 4-(4-hydroxy-4-methyl amyl)-Δ3-cyclohexene carboxaldehyde were diluted to a total volume of 1.0 liter with isopropanol and hydrogenated at 100° C., and a pressure of 2000 p.s.i. in the presence of 25 grams of Raney nickel.

The material was cooled, the catalyst recovered by filtration, and the solvent isopropanol recovered under vacuum.

The residue of 485 grams was found to be free from carbonyl and unsaturation by infrared spectra and chemical analysis. (Oximation test and bromine number.)

*Step 2.*—A mixture of 150 grams of chromic oxide in 1500 ml. of anyhdrous pyridine was prepared by the gradual addition of the chromic oxide over a period of one hour, at 20° to 25° C., to the pyridine.

A solution of 108 grams of 4-(4-hydroxy-4-methyl amyl)-cyclohexyl carbinol, prepared as above, in 1500 ml. of anhydrous pyridine were added to the chromic oxide solution over a period of 15 minutes, and the mass was then permitted to stand overnight.

The reaction mass was then poured into 10 liters of water and extracted with a solution of benzene and ether. The bulked extracts were washed with water, dried over sodium sulfate, and the solvents removed under vacuum.

The residue was then vacuum distilled to give 50 grams of a product with the following constants: B.P.$_{.2\ mm}$. 135° C. $n_D^{25}$ 1.4820, and testing 95% as aldehyde by oximation test. This product is 4-(4-hydroxy 4-methyl amyl) cyclohexane carboxaldehyde. The product has a fine, sweet floral odor reminiscent of lily of the valley. Yield equals 46.3% by weight of starting carbinol.

EXAMPLE 4

*Preparation of acetate of 4-(4-methyl 4-hydroxy amyl) Δ-3-cyclohexene carboxaldehyde*

1500 grams of myrcenyl acetate-terpinyl acetate mixture (approximately 75% as myrcenyl acetate) derived by the sulfuric acid catalyzed addition of acetic acid to myrcene, as described above, added to 594 grams of acrolein and 10 grams of hydroquinone were heated and agitated at 150° C. for 4 hours. After cooling, the product was distilled under vacuum of approximately 1 mm., and yielded 646 grams of an adduct, which upon redistillation, gave a product testing 96% as the acetate $n_D^{25}$ 1.4743 and B.P. 129° to 133° C. at 1.33 mm., giving a yield of approximately 45%. The product possesses a soft, floral scent. It is the acetate of 4-(4-methyl, 4-hydroxy amyl) Δ-3-cyclohexene carboxaldehyde.

EXAMPLE 5

In standard glass equipment with stirrer, thermometer and addition-funnel, 1460 grams of alcohol mixture (40% myrcenol content, 60% isomeric alcohols inert to the reaction hereinbelow) were heated to 80° C. and over a period of one hour at a temperature range between 80 and 105° C., 205 grams of propargyl aldehyde were added. The temperature of the mass was then raised to 125° C. and maintained there for one hour. The mass is allowed to cool and is subjected to vacuum fractionation. After a forerun of unreacted inert isomeric $C_{10}$ alcohols distilled off, there was obtained 536 grams of product boiling in the range at 2 mm. 145 to 168° C., and containing 94% of the final product, which is the aldehyde mentioned below. On redistillation there was obtained 415 grams of product boiling at 2 mm. in the range 131 to 146° C., with a refractive index at 25° in the range 1.4914 to 1.5204; specific gravity at 25° C. in the range 0.9907 to 1.0298. The product tests 96% aldehyde by oximation test, and represents a yield by weight equal to 71% based on the myrcenol used. The product is a mixture of isomers of 4-(4-methyl, 4-hydroxy amyl) Δ 3,6 cyclohexadiene carboxaldehyde. The product has a very sweet lily of the valley aromatic odor.

This application is a continuation-in-part of our application Serial No. 733,806, filed May 8, 1958.

We claim:

1. 4-(4-methyl, 4-hydroxy amyl) Δ 3-cyclohexene carboxaldehyde, having the following formula:

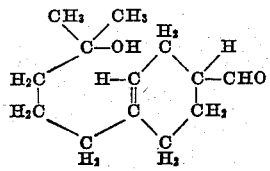

2. 6-methyl-4-(4-methyl, 4-hydroxy amyl) Δ 3-cyclohexene carboxaldehyde, having the formula:

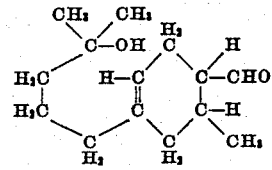

3. 4-(4-methyl, 4-hydroxy amyl)-cyclohexene carboxaldehyde, having the formula:

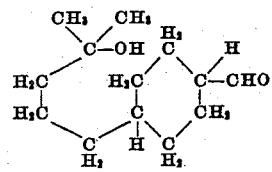

4. 4-(4-methyl, 4-hydroxy amyl) Δ 3,6-cyclohexadiene carboxaldehyde, having the formula:

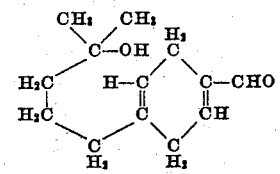

5. The lower alkanoic acid ester of 4-(4-methyl, 4-hydroxy amyl) Δ 3-cyclohexene carboxaldehyde having the formula:

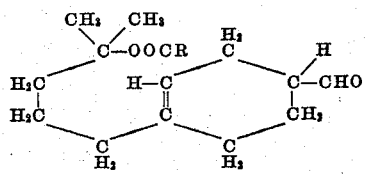

where OOCR is a lower alkanoic acid radical.

6. The acetate of 4-(4-methyl, 4-hydroxy amyl) Δ 3-cyclohexene carboxaldehyde having the formula:

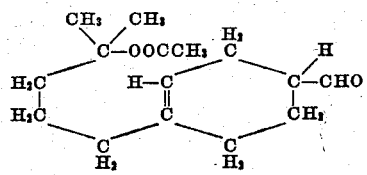

References Cited in the file of this patent

UNITED STATES PATENTS

| | | |
|---|---|---|
| 1,944,732 | Diels et al. | Jan. 23, 1934 |
| 2,407,937 | Rummelsburg | Sept. 17, 1946 |
| 2,842,598 | Kitchens | July 8, 1958 |